United States Patent
Hodén

Patent Number: 5,725,783
Date of Patent: Mar. 10, 1998

[54] CONCENTRATING METHOD AND MEANS THEREFOR

[75] Inventor: Ebbe Hodén, Mariefred, Sweden

[73] Assignee: Sunds Defibrator Industries Aktiebolag, Sweden

[21] Appl. No.: 436,343

[22] PCT Filed: Nov. 25, 1993

[86] PCT No.: PCT/SE93/01017

§ 371 Date: May 19, 1995

§ 102(e) Date: May 19, 1995

[87] PCT Pub. No.: WO94/12260

PCT Pub. Date: Jun. 9, 1994

[30] Foreign Application Priority Data

Nov. 25, 1992 [SE] Sweden .................................. 9203547

[51] Int. Cl.$^6$ .................................. B01D 37/00; B30B 9/24
[52] U.S. Cl. .................................. 210/770; 210/783; 210/350; 210/400; 210/401; 162/56; 162/210; 162/308; 162/313; 198/819; 198/839; 100/118; 100/120
[58] Field of Search .................................. 162/56, 208, 210, 162/308, 313; 198/819, 839; 100/110, 118, 120; 210/783, 400, 248, 401, 770, 350

[56] References Cited

U.S. PATENT DOCUMENTS

| | | |
|---|---|---|
| 2,796,810 | 6/1957 | Muller . |
| 3,338,383 | 8/1967 | Hashimoto . |
| 4,017,398 | 4/1977 | Hartmann et al. . |
| 4,039,450 | 8/1977 | Brown .................................. 198/819 |
| 5,520,824 | 5/1996 | Sasaki .................................. 210/783 |

FOREIGN PATENT DOCUMENTS 341176  11/1929  United Kingdom .

*Primary Examiner*—Robert J. Popovics
*Attorney, Agent, or Firm*—Lerner, David, Littenberg, Krumholz & Mentlik

[57] ABSTRACT

Methods and apparatus for concentrating a liquid suspension of solid particles are disclosed including providing a screening web moving in an endless path, folding the screening web into a tubular configuration at a first location along that path, unfolding the screening web from that tubular configuration at a second location along that path, introducing the liquid suspension into the tubular configuration of the screening web proximate to the first location so that liquid can pass outwardly through the tubular configuration of the screening web and a concentrate of the solid particles can be formed therein, and removing the concentrate from the screening web proximate to the second location.

56 Claims, 3 Drawing Sheets

CONCENTRATING METHOD AND MEANS THEREFOR

FIELD OF THE INVENTION

The present invention relates to methods for concentrating a liquid suspension of solid particles, particularly fibers, by screening the suspension. More particularly, the present invention also relates to apparatus for concentrating such liquid suspensions by screening same.

BACKGROUND OF THE INVENTION

It has been suggested in the past to concentrate liquid-particle suspensions, such as to de-water highly diluted paper pulp suspensions, by passing the suspensions through stationary, perforated screening cylinders that are comprised of a relatively soft, flexible and perforated material. The liquid present in the suspension can thus pass through the walls of the screening cylinders while the concentrate exits from or is discharged through one end of the respective screening cylinders. In the case of concentrates having a high dry solids content, significant frictional forces may be generated between the cylinder wall and the concentrate, rendering it difficult to discharge the concentrate.

The object of the present invention is thus to provide a novel method and a novel apparatus with which the aforesaid difficulties can now be avoided.

SUMMARY OF THE INVENTION

In accordance with the present invention, these and other objects have now been realized by the discovery of a method for concentrating a liquid suspension of solid particles comprising providing a screening web moving in an endless path, folding the screening web into a tubular configuration at a first location along the endless path, unfolding the screening web from the tubular configuration at a second location along the endless path, introducing this liquid suspension into the tubular configuration of the screening web proximate to the first location whereby the liquid can pass outwardly through the tubular configuration of the screening web and a concentrate of the solid particles can be formed therein, and removing the concentrate from the screening web proximate to the second location. In accordance with one embodiment, the solids particles comprise fibers.

In accordance with another embodiment of the method of the present invention, the method includes moving the screening web continuously in the endless path. In another embodiment, however, the method comprises moving the screening web intermittently in the endless path.

In accordance with another embodiment of the method of the present invention, the method includes passing the tubular configuration of the screening web through a tubular perforated support tube at a support location downstream of the first location.

In accordance with another embodiment of the method of the present invention, the method includes passing the tubular configuration of the screening web around a driven roller so as to drive the screening web along the endless path. In a preferred embodiment, the driven roller has a first diameter and the tubular configuration of the screening web has a second diameter, with the first diameter being greater than the second diameter.

In accordance with another embodiment of the method of the present invention, the method includes passing the tubular configuration of the screening web around a driven roller so as to drive the screening web along the endless path at a location downstream of the support location. In accordance with this embodiment, the method includes pressing the tubular configuration of the screening web against the driven roller. Preferably, this is carried out by means of at least one pressure roller.

In accordance with another embodiment of the method of the present invention, the method includes providing a secondary web of highly liquid permeable material and folding the secondary web into a tubular configuration within the tubular configuration of the screening web. Preferably, this method includes removing the concentrate from the screening web proximate to the second location by encasing the concentrate in the secondary web.

In accordance with a preferred embodiment to the method of the present invention, the method includes inclining the tubular configuration of the screening web in a downward direction from the first location to the second location.

In accordance with the apparatus for concentrating a liquid suspension of solid particles of the present invention, the apparatus includes a screening web, means for moving the screening web in an endless path, web folding means at a first location along the endless path for folding the screening web into a tubular configuration, unfolding means at a second location along the endless path for unfolding the screening web from the tubular configuration, liquid suspension introduction means for introducing the liquid suspension into the tubular configuration of the screening web proximate to the first location, whereby the liquid can pass outwardly through the tubular configuration of the screening web and a concentrate of the solid particles can be formed therein, and concentrate removal means for removing the concentrate from the screening web proximate to the second location. Preferably, the solid particles comprise fibers.

In accordance with one embodiment of the apparatus of the present invention, the means for moving the screening web comprises means for continuously moving the screening web. In another embodiment, the means for moving the screening web comprises means for intermittently moving the screening web.

In accordance with another embodiment of the apparatus of the present invention, the tubular configuration of the screening web slopes downwardly from the first location to the second location. In another embodiment, the apparatus includes a tubular perforated support tube surrounding the tubular configuration of the screening web at a support location downstream of the first location.

In accordance with another embodiment of the apparatus of the present invention, the apparatus includes a driven roller in contact with the tubular configuration of the screening web for driving the screening web along the endless path. Preferably, the driven roller has a first diameter and the tubular configuration has a second diameter, the first diameter being greater than the second diameter.

In accordance with another embodiment of the apparatus of the present invention, the apparatus includes a driven roller in contact with the tubular configuration of the screening web for driving the screening web along the endless path at a location downstream of the support location. Preferably, the apparatus includes pressure means for pressing the tubular configuration of the screening web against the driven roller, most preferably at least one pressure roller.

In accordance with another embodiment of the apparatus of the present invention, the apparatus includes a secondary web of highly liquid permeable material, and secondary folding means for folding the secondary web into a tubular configuration within the tubular configuration of the screening web. Preferably, the secondary folding means comprises a web folding means.

In accordance with another embodiment of the apparatus of the present invention, the apparatus includes liquid collection means for collecting the liquid which passes outwardly through the tubular configuration of the screening web. In a preferred embodiment, the liquid collection means comprises a liquid collection tray, preferably including a drainage outlet for conducting the liquid away from the endless path.

By using the method and apparatus of this invention, it is now possible to ensure that friction which occurs between the concentrate and the screening cloth webs has little, if any, influence on the discharge of concentrate therefrom.

BRIEF DESCRIPTION OF THE DRAWINGS

The subject matter of the present invention will be more readily understood with reference to the following detailed description, which refers to the accompanying drawings in which.

DETAILED DESCRIPTION

Figure 1:
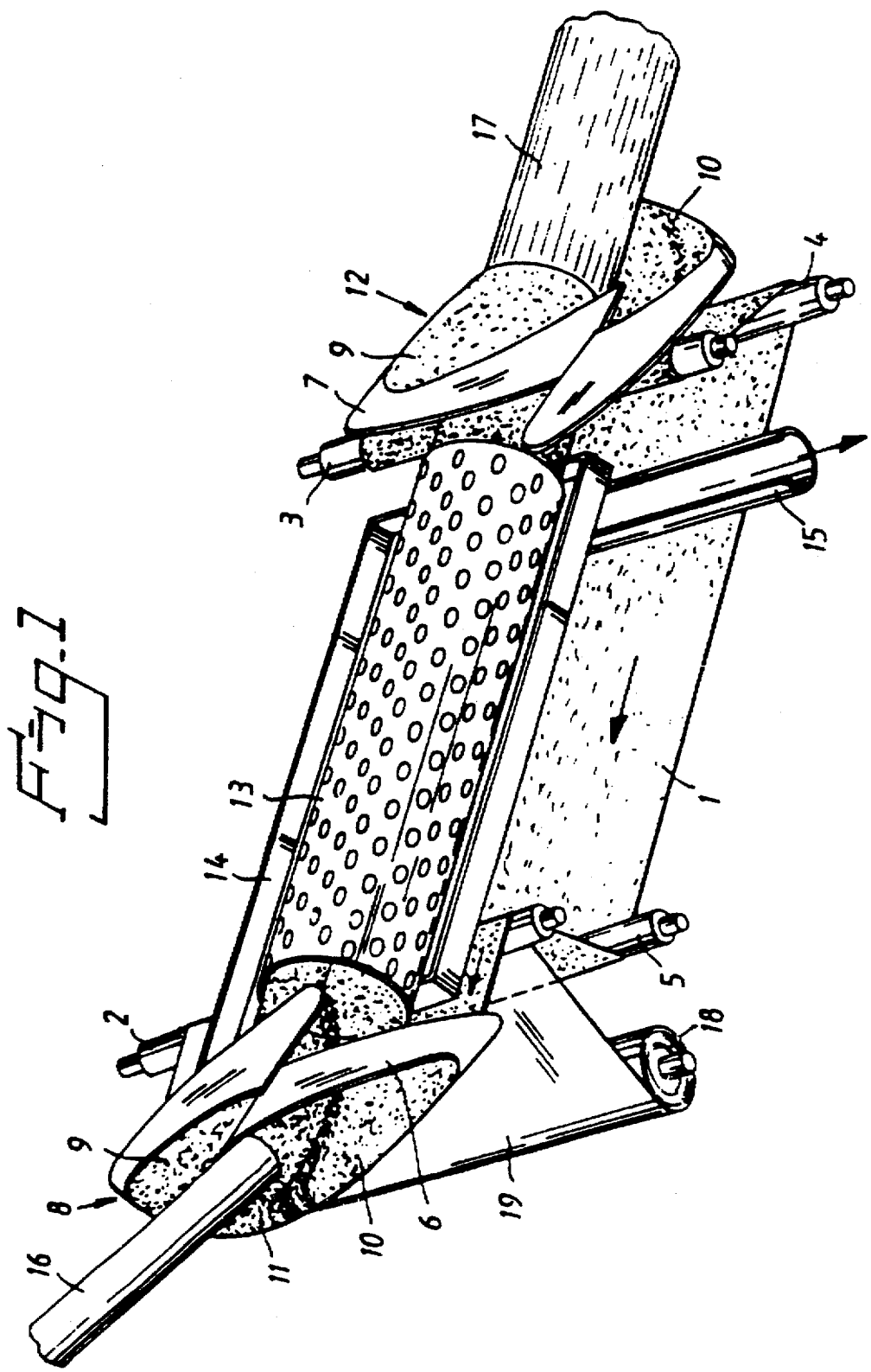
FIG. 1 is a side, perspective view, partially schematic in nature, of one embodiment of the apparatus of the present invention.

Referring to the Figures, the apparatus illustrated in FIG. 1 includes an endless, relatively soft and flexible screening web, such as a wire web, which is preferably comprised of a plastic material. The screening web 1 is guided in an endless path around guide rollers 2–5 and around web-folding and web-unfolding devices, 6 and 7, respectively. The apparatus also includes a pair of motor-driven rolls (not shown) by means of which the screening web 1 is moved continuously or intermittently in the direction indicated by arrows in FIG. 1. Longitudinal edge portions 9, 10 of the web 1 are folded over a center web portion 11 at a first station 8 along the path traveled by the web by means of the web-folding device 6, so as to form a screening tube which is closed by the web. The web 1 is then unfolded into a flat shape by means of the web-unfolding device 7 at a second station 12 along the web-path, so that the web will pass around the guide rollers 2–5 back to the first station 8 in an unfolded state. In the section between the first and the second stations, 8 and 12, in which the web-path slopes downwards in the direction of web movement, the folded tubular-shaped web 1 is encircled by a perforated supportive tube or cylinder 13. A liquid-collecting tray 14 having an outlet 15 for removing liquid from this section of the web path extends beneath the tubular web and the supportive cylinder 13.

Reference numeral 16 identifies the end of a conduit through which fiber suspension to be concentrated is delivered to the apparatus, and reference numeral 17 identifies the resultant concentrate. A further web 19 comprised of highly liquid-permeable material is wound on a storage roller 18. The further web 19 is guided around the guide roller 2 together with the screening web 1 and is folded at 8 to form a second tube which is located within the first tube formed by folding the screening web 1. The further web 19 can be unfolded at 12 and wound onto another storage roller, or alternatively may be retained around the concentrate 17 and discharged form the apparatus at station 12 as a casing which encases and accompanies the concentrate.

When using the suspension concentrating apparatus illustrated in the drawings, the suspension to be concentrated is introduced into the apparatus at station 8 through conduit 16, to the tube formed by the screening web 1. In this manner, liquid leaves through the tube walls and through the perforated supportive cylinder 13 surrounded by that tube. The liquid runs down into the collecting tray 14 and departs therefrom through outlet 15. Formed concentrate is collected in the tube and forms a concentrate plug 17 in the lower end of the tube, the plug being discharged from the tube at station 12 by driving the screening web 1 in the direction of the arrows shown, either intermittently or continuously. The concentrating apparatus may be used advantageously in the pulp and paper industry for concentrating pulp suspensions or for recovering fiber, etc., from white water, for example.

In those instances when the concentrate plug 17 is formed from very small particles, a further web 19 of smaller mesh size can be used. Similarly, when it is desirable to hold together the concentrate plug 17 formed in the apparatus, a further web 19 may be utilized, which is allowed to remain around the plug 17 to form a plug holding casing. The further web 19 may advantageously consist of an essentially autogenous material, for instance paper, when concentrating suspensions that contain cellulose fibers intended for recycling purposes, so as to enable the fibers in the web to be recovered together with the fibers embraced by the web.

The illustrated-web folding device 6 is of a known kind and includes a first folding edge which extends transversely to the direction of web movement and over which the central portion 11 of the web 1 is folded. Located at a respective end of the first web-folding edge are folding edges which extend obliquely forwards and outwards and obliquely forwards and inwards as seen in the direction of web movement, over which the longitudinal edge parts, 9, 10, of the web 1 are first folded in over the central portion of the web 1, and then again folded so as to again extend parallel with the central portion 11. In their folded state, the edges of the web overlap one another, so that the web forms a closed tube. The web-unfolding device 7 has the same configuration as the device 6 but in the reverse sense, so that the web is guided in an opposite direction therethrough.

Figure 2:
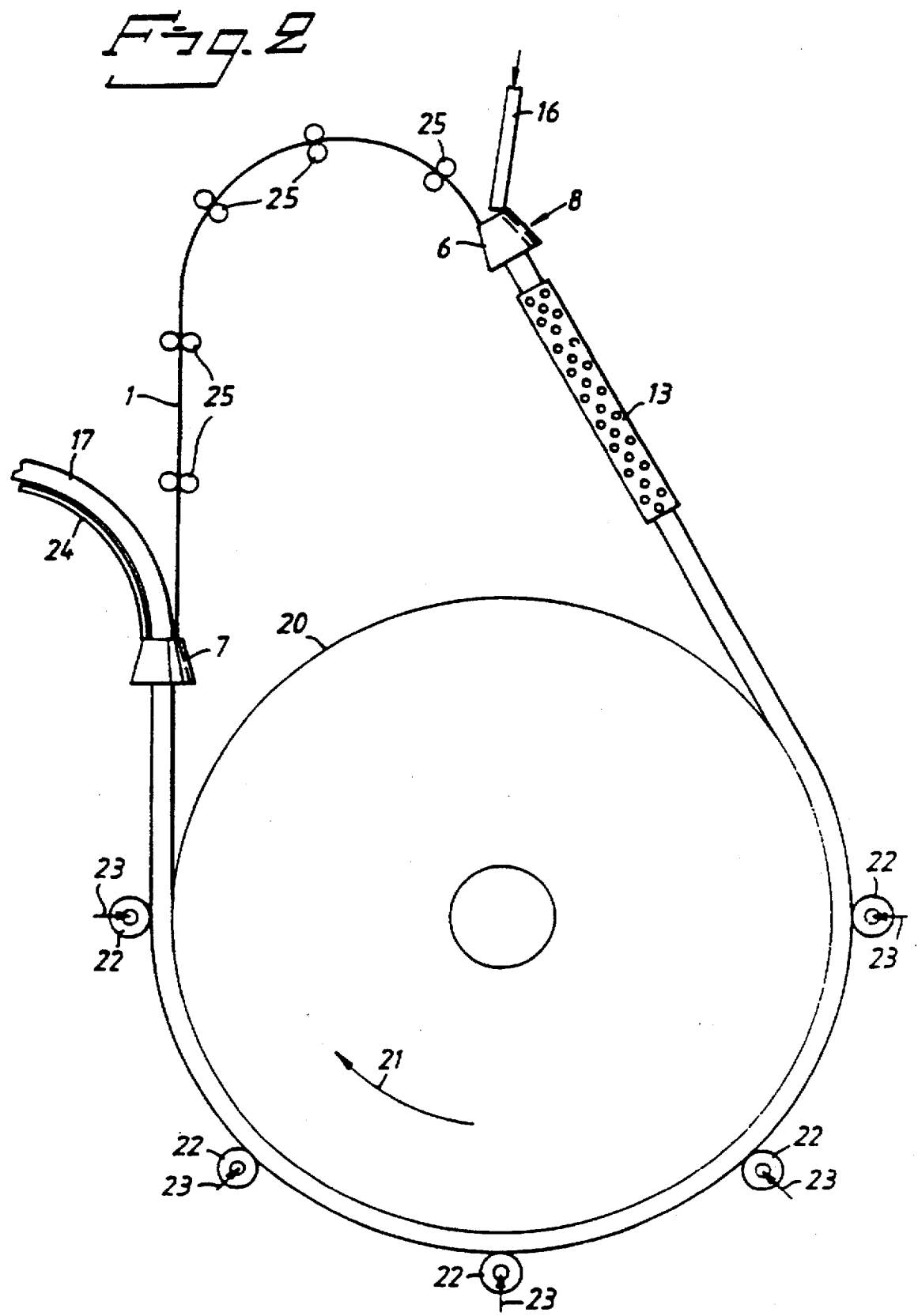
FIG. 2 is an elevational, schematic view of another embodiment of the apparatus of the present invention.
Figure 3:
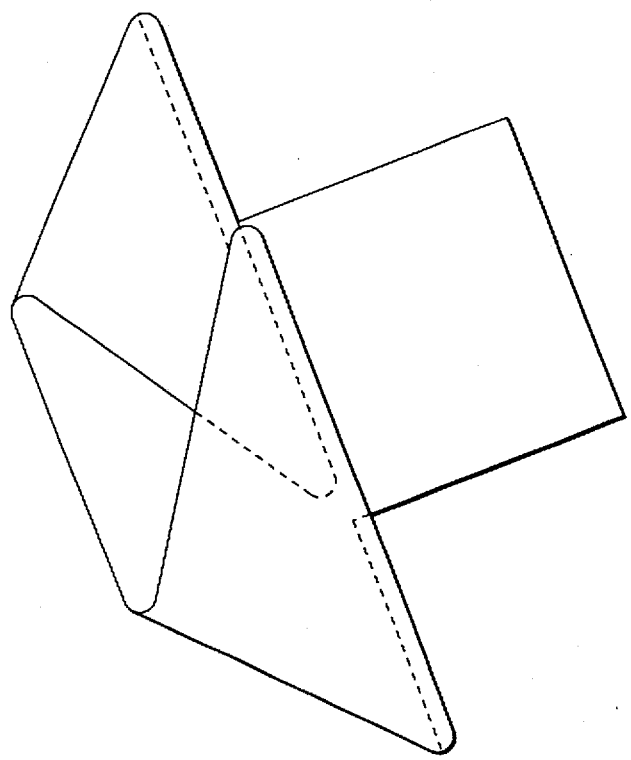
FIG. 3 is a perspective view of the web folding device used in the apparatus of the present invention.

FIG. 2 illustrates an endless screening web which is shaped in a web-folding device 6 to form a tube at a first station 8, and is unfolded in a web-unfolding device 7 at a second station 12, in the manner described with reference to FIG. 1. Suspension to be concentrated, for instance a paper pulp suspension to be de-watered, is passed through a conduit 16 and into the tube-shaped web, at which point a large portion of the suspension liquid departs as the tube-shaped web is led through a downwardly sloping or possibly vertical perforated supportive tube or cylinder 13. The tube-shaped web 1 is then led into frictional contact with a large roller or drum 20, which is driven in the direction of arrow 21 by means of a motor (not shown) and drives the web 1 around the endless web path. The web 1 extends around a large part of the periphery of the roller 20 and the periphery of that roller may be provided with a shallow web-guiding recess. The tube-shaped web 1, containing partially concentrated or partially de-watered suspension, is pressed against the periphery of the driven roller 20 by pressure rollers 21, as indicated by arrows 23, so as to further concentrate or de-water the suspension.

The apparatus illustrated in FIG. 2 also comprises a guide plate 24 which functions to guide the concentrate plug 17, while guide rollers 25 serve to guide the web 1 unfolded at station 12 to the web-folding device 6. The web-folding and unfolding devices 6 and 7 may conveniently be oriented such as to lay the mutually overlapping web edges of the tube-shaped web 1 adjacent the periphery of the roller 20. It will be understood that the web 1 may move in a path different to that illustrated.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A method for concentrating a liquid suspension of solid particles comprising providing a screening web moving in an endless path, folding said screening web into a tubular configuration at a first location along said endless path, providing a secondary web of highly liquid permeable material, folding said secondary web into a tubular configuration within said tubular configuration of said screening web, unfolding said screening web from said tubular configuration at a second location along said endless path, introducing said liquid suspension into said tubular configuration of said screening web proximate to said first location whereby said liquid can pass outwardly through said tubular configuration of said screening web and a concentrate of said solid particles can be formed therein, and removing said concentrate from said screening web proximate to said second location.

2. The method of claim 1 wherein said solid particles comprise fibers.

3. The method of claim 1 comprising moving said screening web continuously in said endless path.

4. The method of claim 1 comprising moving said screening web intermittently in said endless path.

5. The method of claim 1 including passing said tubular configuration of said screening web through a tubular perforated support tube at a support location downstream of said first location.

6. The method of claim 1 including passing said tubular configuration of said screening web around a drive roller so as to drive said screening web along said endless path.

7. The method of claim 6 wherein said driven roller has a first diameter and wherein said tubular configuration of said screening web has a second diameter, said first diameter being greater than said second diameter.

8. The method of claim 5 including passing said tubular configuration of said screening web around a driven roller so as to drive said screening web along said endless path at a location downstream of said support location.

9. The method of claim 6 or 8 including pressing said tubular configuration of said screening web against said driven roller.

10. The method of claim 9 wherein said pressing of said tubular configuration against said driven roller is carried out by at least one pressure roller.

11. The method of claim 1 wherein said removing of said concentrate from said screening web proximate to said second location comprises encasing said concentrate in said secondary web.

12. The method of claim 1 wherein said solid particles comprise fibers and wherein said secondary web comprises fibers.

13. The method of claim 1 including inclining said tubular configuration of said screening web in a downward direction from said first location to said second location.

14. An apparatus for concentrating a liquid suspension of solid particles comprising a screening web, means for moving said screening web in an endless path, a secondary web of highly liquid permeable material, web folding means at a first location along said endless path for folding said screening web and said secondary web into a tubular configuration with said secondary web within said tubular configuration of said screening web, web unfolding means at a second location along said endless path for unfolding said screening web and said secondary web from said tubular configuration, liquid suspension introduction means for introducing said liquid suspension into said tubular configuration of said screening web proximate to said first location, whereby said liquid can pass outwardly through said tubular configuration of said screening web and a concentrate of said solid particles can be formed therein, and concentrate removal means for removing said concentrate from said screening web proximate to said second location.

15. The apparatus of claim 14 wherein said solid particles comprise fibers.

16. The apparatus of claim 14 wherein said means for moving said screening web comprises means for continuously moving said screening web.

17. The apparatus of claim 14 wherein said means for moving said screening web comprises means for intermittently moving said screening web.

18. The apparatus of claim 14 wherein said tubular configuration of said screening web slopes downwardly from said first location to said second location.

19. The apparatus of claim 14 including a tubular perforated support tube surrounding said tubular configuration of said screening web at a support location downstream of said first location.

20. The apparatus of claim 19 including a driven roller in contact with said tubular configuration of said screening web for driving said screening web along said endless path at a location downstream of said support location.

21. The apparatus of claim 14 including a driven roller in contact with said tubular configuration of said screening web for driving said screening web along said endless path.

22. The apparatus of claim 21 wherein said driven roller has a first diameter and said tubular configuration has a second diameter, said first diameter being greater than said second diameter.

23. The apparatus of claim 21 or 20 including pressure means for pressing said tubular configuration of screening web against said driven roller.

24. The apparatus of claim 23 wherein said pressure means comprises at least one pressure roller.

25. The apparatus of claim 14 including liquid collection means for collecting said liquid which passes outwardly through said tubular configuration of said screening web.

26. The apparatus of claim 25 wherein said liquid collection means comprises a liquid collection tray.

27. The apparatus of claim 26 wherein said liquid collecting tray includes a drainage outlet for conducting said liquid away from said endless path.

28. A method for concentrating a liquid suspension of solid particles comprising providing a screening web having a central portion and first and second edge portions moving in an endless path, folding said screening web into a tubular configuration at a first location along said endless path by passing said central portion of said screening web over a first transverse folding edge while passing said first and second edge portions of said screening web over pairs of web folding edges extending inwardly and outwardly with respect to said first transverse folding edge from both sides thereof whereby said screening web is folded into said tubular configuration without tensioning said first and second edge portions of said screening web more than said central portion of said screening web, unfolding said screening web from said tubular configuration at a second location along said endless path by passing said central portion of said screening web over a second transverse folding edge while passing said first and second edge portions of said screening web over a pair of web unfolding edges extending above said second transverse folding edge so as to unfold said screening web, introducing said liquid suspension into said tubular configuration of said screening web proximate to said first location whereby said liquid can pass outwardly through said tubular configuration of said screening web and a concentrate of said solid particles can be formed therein, and removing said concentrate from said screening web proximate to said second location.

29. The method of claim 28 wherein said solid particles comprise fibers.

30. The method of claim 28 comprising moving said screening web continuously in said endless path.

31. The method of claim 28 comprising moving said screening web intermittently in said endless path.

32. The method of claim 28 including passing said tubular configuration of said screening web through a tubular perforated support tube at a support location downstream of said first location.

33. The method of claim 28 including passing said tubular configuration of said screening web around a driven roller so as to drive said screening web along said endless path.

34. The method of claim 33 wherein said driven roller has a first diameter and wherein said tubular configuration of said screening web has a second diameter, said first diameter being greater than said second diameter.

35. The method of claim 32 including passing said tubular configuration of said screening web around a driven roller so as to drive said screening web along said endless path at a location downstream of said support location.

36. The method of claim 33 or 35 including pressing said tubular configuration of said screening web against said driven roller.

37. The method of claim 36 wherein said pressing of said tubular configuration against said driven roller is carried out by at least one pressure roller.

38. The method of claim 28 including providing a secondary web of highly liquid permeable material, and folding said secondary web into a tubular configuration within said tubular configuration of said screening web.

39. The method of claim 38 wherein said removing of said concentrate from said screening web proximate to said second location comprises encasing said concentrate in said secondary web.

40. The method of claim 38 wherein said solid particles comprise fibers and wherein said secondary web comprises fibers.

41. The method of claim 28 including inclining said tubular configuration of said screening web in a downward direction from said first location to said second location.

42. An apparatus for concentrating a liquid suspension of solid particles comprising a screening web having a central portion and first and second edge portions, means for moving said screening web in an endless path, web folding means at a first location along said endless path for folding said screening web into a tubular configuration, said web folding means comprising a first transverse folding edge, a first pair of web folding edges extending from both sides of said first transverse folding edge inwardly with respect to said transverse folding edge, and a second pair of web folding edges extending from both sides of said first transverse folding edge outwardly with respect to said first transverse folding edge so as to overlap said first web folding edge whereby said web is folded into said tubular configuration without tensioning said edge portions of said web greater than said central portion of said web, web unfolding means at a second location along said endless path for unfolding said screening web from said tubular configuration, said web unfolding means comprising a second transverse folding edge, a third pair of web folding edges extending from both sides of said second transverse folding edge inwardly with respect to said second transverse folding edge, and a fourth pair of web folding edges extending from both sides of said second transverse folding edge outwardly with respect to said second transverse folding edge whereby said web is unfolded thereby, liquid suspension introduction means for introducing said liquid suspension into said tubular configuration of said screening web proximate to said first location, whereby said liquid can pass outwardly through said tubular configuration of said screening web and a concentrate of said solid particles can be formed therein, and concentrate removal means for removing said concentrate from said screening web proximate to said second location.

43. The apparatus of claim 42 wherein said solid particles comprise fibers.

44. The apparatus of claim 42 wherein said means for moving said screening web comprises means for continuously moving said screening web.

45. The apparatus of claim 42 wherein said means for moving said screening web comprises means for intermittently moving said screening web.

46. The apparatus of claim 42 wherein said tubular configuration of said screening web slopes downwardly from said first location to said second location.

47. The apparatus of claim 42 including a tubular perforated support tube surrounding said tubular configuration of said screening web at a support location downstream of said first location.

48. The apparatus of claim 47 including a driven roller in contact with said tubular configuration of said screening web for driving said screening web along said endless path at a location downstream of said support location.

49. The apparatus of claim 42 including a driven roller in contact with said tubular configuration of said screening web for driving said screening web along said endless path.

50. The apparatus of claim 49 wherein said driven roller has a first diameter and said tubular configuration has a second diameter, said first diameter being greater than said second diameter.

51. The apparatus of claim 49 or 48 including pressure means for pressing said tubular configuration of screening web against said driven roller.

52. The apparatus of claim 51 wherein said pressure means comprises at least one pressure roller.

53. The apparatus of claim 42 including a secondary web of highly liquid permeable material, whereby said web folding means folds both said screening web and said secondary web into a tubular configuration.

54. The apparatus of claim 42 including liquid collection means for collecting said liquid which passes outwardly through said tubular configuration of said screening web.

55. The apparatus of claim 54 wherein said liquid collection means comprises a liquid collection tray.

56. The apparatus of claim 55 wherein said liquid collecting tray includes a drainage outlet for conducting said liquid away from said endless path.

* * * * *

UNITED STATES PATENT AND TRADEMARK OFFICE
CERTIFICATE OF CORRECTION

PATENT NO.  :  5,725,783
DATED  :  March 10, 1998
INVENTOR(S)  :  Hoden It is certified that error appears in the above-identified patent and that said Letters Patent is hereby corrected as shown below:

Column 5, line 45, "drive" should read --driven--.

Signed and Sealed this

Twenty-third Day of June, 1998

*Attest:*

BRUCE LEHMAN

*Attesting Officer*  Commissioner of Patents and Trademarks